July 6, 1926.

L. W. HASSENSALL

BEVERAGE DISPENSING APPARATUS

Filed May 19, 1925

Inventor
L. W. Hassensall
By Lacey & Lacey, Attorneys

July 6, 1926.

L. W. HASSENSALL 1,591,623

BEVERAGE DISPENSING APPARATUS

Filed May 19, 1925     2 Sheets-Sheet 2

Inventor

L. W. Hassensall

By Lacey & Lacey, Attorneys

Patented July 6, 1926.

1,591,623

UNITED STATES PATENT OFFICE.

LOUIS W. HASSENSALL, OF TOLEDO, OHIO.

BEVERAGE-DISPENSING APPARATUS.

Application filed May 19, 1925. Serial No. 31,413.

This invention relates to apparatus for dispensing beverages and has as one of its objects to provide an apparatus which may be readily installed upon any soda water fountain counter or other convenient support and, by the use of which, beverages may be dispensed at a lower maintenance cost than is possible by means of the ordinary apparatuses now employed. It is the practice, in dispensing fruit juices and other beverages from large sized bottles, to invert the bottle and support the same upon a refrigerating unit having a chamber to receive the contents of the bottle and from which chamber the fruit juices or other beverages may be drawn by a suitable faucet. However, a dispensing apparatus of this type presents the disadvantage that the receiving chamber must be frequently cleaned and, in any event, the refrigerating unit must be iced at least once a day, which is an item of expense which the present invention contemplates eliminating. In view of the disadvantage noted, the present invention has as its object to provide means for the support of the bottle containing the fruit juice or other beverage in an inverted position, and delivering the beverage through a coil which is located within an ice chest or cabinet beneath the counter upon which the supporting means is mounted and in which chest the attendant at the counter ordinarily places small bottles of beverages, the coil terminating in a faucet through which the beverage may be drawn and the support constituting a temporary container for the beverage delivered from the bottle. Inasmuch as a druggist or confectioner is required, in any event, to keep bottles of beverages in an ice chest or other compartment beneath the counter and must daily ice the said chest or compartment, the provision of a cooling coil such as contemplated by the invention, and the arrangement of the coil within said ice chest or compartment, effects, as will be readily understood, an economy in ice as well as obviating the necessity of icing not only the compartment but also the refrigerating unit ordinarily employed in supporting large bottles of beverages.

Another object of the invention is to provide an exceptionally substantial and highly ornamental and attractive supporting means for the beverage bottle, the said means including a temporary container for the beverage and a novel form of pedestal for supporting the said container, and the construction being such that the temporary container may be readily cleaned when occasion requires, although its formation is such that there can be no collection of sediment in the bottom thereof.

Another object of the invention is to so construct the temporary container and the supporting pedestal or stand therefor, that there can be no accidental displacement of the said container with relation to the stand and consequently no displacement of the coil within the ice chest.

In the accompanying drawings:—

Figure 4 is a horizontal sectional view taken substantially on the line 4—4 of Figure 1, looking in the direction indicated by the arrows.

Figure 3:
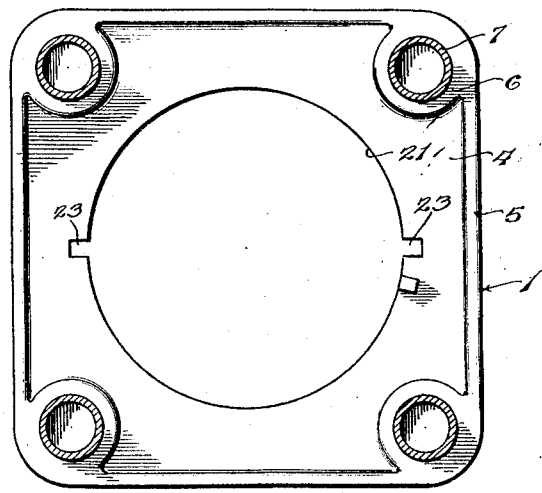
Figure 3 is a horizontal sectional view taken substantially on the line 3—3 of Figure 2, looking in the direction indicated by the arrows.

The apparatus embodying the invention includes a stand which is indicated in general by the numeral 1 and a temporary container which is indicated in general by the numeral 2, and which is supported by the stand and, in turn, supports the inverted beverage containing bottle 3, in a manner which will presently be explained. The stand 1 comprises a top 4 which is preferably in the nature of a single integral casting preferably of rectangular marginal contour as shown in Figure 3 of the drawings, although it may be given some other marginal contour if found desirable. The said top 4 is preferably flat upon its upper side and is provided with a marginal depending flange or apron indicated by the numeral 5, and at each corner the top 4 is formed upon its under side with a boss 6 of substantially the same depth as the flange 5, and each boss is formed to provide a threaded socket indicated by the numeral 7. The legs of the stand are indicated by the numeral 8 and these legs or columns are preferably in the nature of lengths of pipe threaded at their upper ends as at 9 and fitted into the respective sockets 7, so that the top 4 is supported at its four corners. The lower ends of the columns 8 are likewise threaded, as indicated by the numeral 10, and fitted thereto are more or less ornamental pipe flanges 11, these flanges being of the type usually found upon the market and each having an axial threaded opening 12 to accommodate the lower end of the respective column 8. The under sides of the flanges 11 are, of course, plane and, therefore, the flanges afford firm support for the lower ends of the columns or legs 8 of the stand, so that there will be no likelihood of overturning of the stand. However, if desired, the flanges 10 may be formed with openings 13 for the passage of securing elements (not shown) whereby the flanges may be secured to the counter top.

Figure 1:
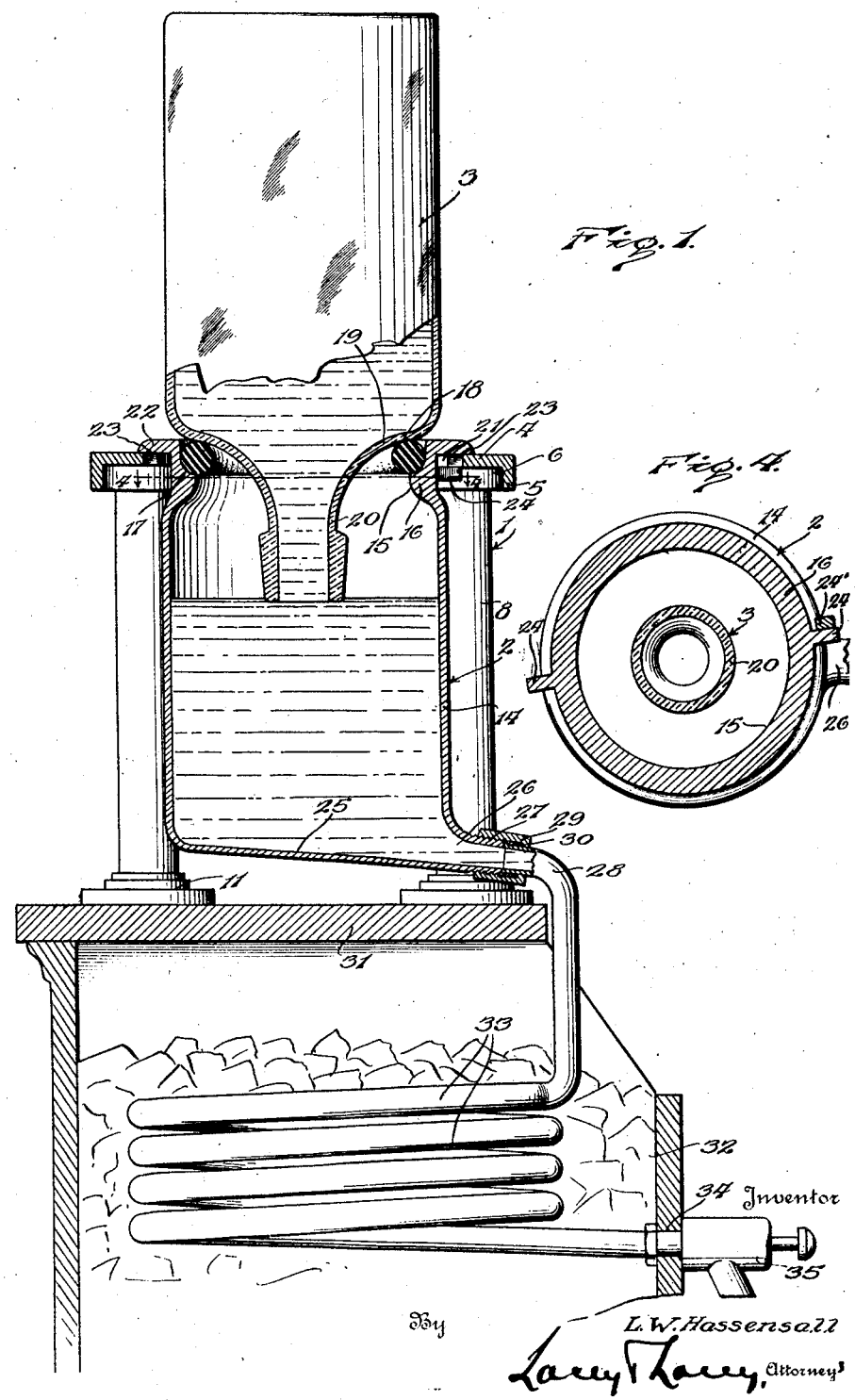
Figure 1 is a vertical front to rear sectional view through the dispensing apparatus embodying the invention.
Figure 2:
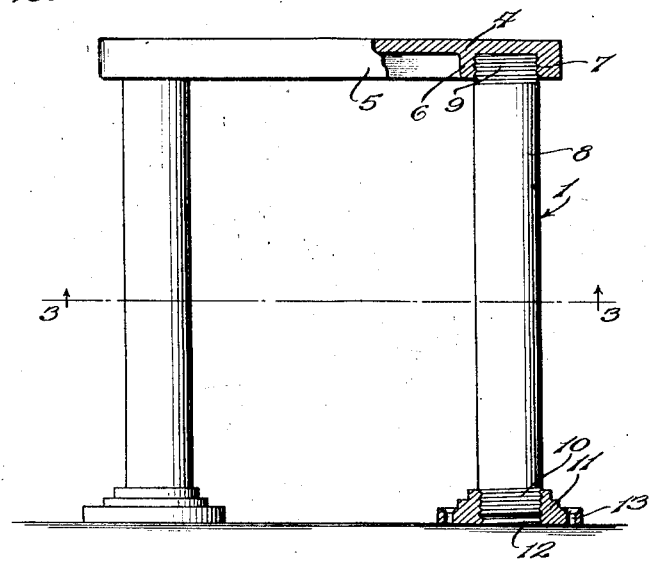
Figure 2 is a view partly in side elevation and partly in vertical section, illustrating the pedestal or stand of the apparatus.

The temporary container 2 comprises a hollow cylindrical body 14 preferably of cast metal and lined with some vitreous material such for example as porcelain or glass. The container body 14 is open at its top, the mouth of the container being indicated by the numeral 15, and the container wall is preferably thickened at its mouth, as indicated by the numeral 16, and formed with a rabbet 17 which extends about the mouth 15 and constitutes a seat for a supporting ring 18 of soft rubber or other suitable material, upon which the shoulder 19 of the bottle 3 is designed to rest, with the neck 20 of the bottle extending downwardly into the container body 14, as best shown in Figure 1 of the drawings. The top 4 of the stand 1 is formed with a circular opening indicated by the numeral 21, which is of a diameter to permit of the body of the container being inserted therethrough from above, and the body of the container is formed at its top with an outstanding horizontally disposed circumscribing flange indicated by the numeral 22 and which is of greater diameter than the body of the container and is designed to rest at its under side at its marginal portion, directly upon the upper side of the top 4 of the stand, the temporary container being, in this manner, supported by the top of the stand. In order to prevent displacement of the container body with relation to the stand, the said top 4 of the stand is preferably formed at diametrically opposite points with notches 23, and the container body 14 is formed at its upper portion at diametrically opposite points with outwardly projecting lugs 24 which are designed to engage through the notches 23. When the container 14 has been disposed within the stand and the lugs 24 have been engaged through the notches 23, the container is rotated to bring the lug 24 which is located at the side thereof which is presented toward the inner side of the counter, into engagement with a lug 24' which is formed upon the under side of the top 4 of the stand, said lug 24' being so positioned that when the lug 24 specifically referred to is in engagement therewith, both lugs 24 will be out of registration with the respective notches 23, and the outlet from the container, to be presently described, will be centrally positioned between the two rear standards 8 of the stand, said lugs 24 at such time engaging beneath the top 4, and the flange 22 resting upon the upper side of the said top.

The bottom of the container, indicated by the numeral 25, is inclined downwardly from one side and at its opposite side the container is provided at its bottom with an integral discharge nipple 26 exteriorly threaded as at 27. A block tin pipe 28 is disposed at one end against the end of the nipple 26 and a coupling 29 is rotatably fitted to the said end of the pipe and threaded onto the nipple 26 so as to connect the end of the pipe with the nipple, a collar 30 being arranged within the coupling 29 and about the said end of the pipe 28 and designed to firmly grip the outwardly flared end of the pipe between it and the end of the nipple and thereby provide a fluid-tight connection between the pipe and nipple.

The apparatus is arranged, as shown in Figure 1 of the drawings, upon the top of a counter 31 or other suitable support, and an ice chest 32 is provided beneath the counter. The pipe 28 is led, from the nipple 26, downwardly past the rear edge of the counter top and the pipe is formed into a number of coils 33 which are housed within the ice chest 32 and covered with the ice in the chest. The other or lower end of the pipe 28 is led through an opening 34 formed in the rear wall of the ice chest 32, and a suitable faucet 35 is arranged upon the projecting end of the pipe and may be manipulated to provide for the delivery of the cooled beverage from the coils 33.

From the foregoing description, it will be evident that there is provided a substantial and extremely simple form of dispensing apparatus which may be readily mounted upon any soda water or similar counter and employed in connection with the usual ice chest arranged beneath said counter, thereby obviating the necessity of icing a separate refrigerating unit for the beverage as has heretofore been customary. The parts are so arranged that the nipple 26 of the temporary container 2 will project between two of the columns or legs 8 of the stand and the engagement of the lug 24 in the notch 23 will serve to maintain the container and stand in this relationship. It will be evident that by downwardly inclining the bottom 25 of the temporary container, no sediment can collect upon the bottom inasmuch as any particles that may be in the beverage will flow off with the beverage through the nipple 26.

It will be understood, of course, that the component parts of the stand 1 may be enameled or otherwise finished and may be ornamented as desired.

Having thus described the invention, what I claim is:—

1. In apparatus for dispensing beverages, a supporting stand, a top having an opening therein, the wall of the opening being formed with oppositely located notches, columns supporting said top, a temporary container disposed within the opening and having an outstanding circumscribing flange resting upon the upper side of the top, the said temporary container having outstanding lugs located beneath the flange in spaced relation thereto and engageable through the said notches in the top of the supporting stand and, in a rotated position of adjustment of the temporary container, engaging beneath the said top out of registration with the notches, a stop lug upon the under side of the top of the supporting stand engaged by one of the lugs upon the container, the said container having an open top to accommodate an inverted beverage bottle, and an outlet at one side of the bottom of the container medially positioned between two of the columns when one of the container lugs is in engagement with the said stop lug upon the top of the supporting stand.

2. In apparatus for dispensing beverages from their original containers, in combination, a supporting structure comprising a top member having a circular opening located centrally thereof, and columns connected at their upper ends to the under side of said top member and supporting the same, a temporary container removably fitted downwardly through the said opening and open at its top to accommodate an inverted beverage bottle, the said container being provided with an outstanding circumscribing flange seating upon the upper side of the said top member and suspending the container therebeneath with its bottom spaced above the plane of the lower ends of the columns to thereby support the said bottom above the surface upon which the lower ends of the columns are disposed, and an outlet spout extending laterally from the bottom of the container at one side of the bottom thereof and between two of said columns.

3. In apparatus for dispensing beverages from their original containers, in combination, a supporting structure comprising a top member having a circular opening located centrally thereof, and columns connected at their upper ends to the under side of the said top member and supporting the same, a temporary container removably fitted downwardly through the opening and open at its top to accommodate an inverted beverage bottle, the said container being provided with an outstanding circumscribing flange resting upon the upper side of the said top member and suspending the container therebeneath with its bottom spaced above the plane of the lower ends of the columns, and means upon the said container engaging beneath the said top member of the supporting structure to prevent upward displacement of the said container.

In testimony whereof I affix my signature.

LOUIS W. HASSENSALL. [L. S.]